United States Patent [19]

Wyland et al.

[11] Patent Number: 5,123,105
[45] Date of Patent: Jun. 16, 1992

[54] PRIORITY ENCODER FOR A CONTENT ADDRESSABLE MEMORY

[75] Inventors: David C. Wyland, San Jose; Zwie Amitai, Sunnyvale, both of Calif.

[73] Assignee: Advanced Micro Devices, Inc., Sunnyvale, Calif.

[21] Appl. No.: 543,670

[22] Filed: Jun. 25, 1990

[51] Int. Cl.⁵ .................................... G06F 13/14
[52] U.S. Cl. ........................ 395/725; 364/DIG. 2; 364/937.01; 364/927.8; 341/102
[58] Field of Search ... 364/200 MS File, 900 MS File; 341/50, 95, 102; 340/825.5, 825.51

[56] References Cited

U.S. PATENT DOCUMENTS

| | | | |
|---|---|---|---|
| 4,334,288 | 6/1982 | Booher | 364/900 |
| 4,348,741 | 9/1982 | McAlister et al. | 364/900 |
| 4,627,018 | 12/1986 | Trost et al. | 364/900 |
| 4,887,084 | 12/1989 | Yamaguchi | 341/102 X |
| 4,928,260 | 5/1990 | Chuang et al. | 364/49 |

Primary Examiner—Thomas M. Heckler
Attorney, Agent, or Firm—Patrick T. King

[57] ABSTRACT

A priority encoder for receiving input request signals at a number of input request terminals and for providing an N-bit output binary code word indicating the binary identification number of the highest-priority, currently-active input request terminal. Each output bit of the output binary code word is provided from a respective logic circuit. Whenever any one of a first group of input request terminals, which are identified as having a logical TRUE value in a particular bit position of the N-bit output binary code word, is active, all of a second group of input request terminals, having a logical FALSE value for the particular bit position, are disabled. Sequential operation of the logic circuits for each output bit is obtained by successively delaying enablement of a logic circuit until high-order logic circuits have completed operation.

6 Claims, 3 Drawing Sheets

PRIORITY ENCODER FOR A CONTENT ADDRESSABLE MEMORY

BACKGROUND OF THE INVENTION

1. Field of the Invention

This invention relates to priority encoders.

2. Prior Art

The basic logic function of a priority encoder is to scan a number of parallel input lines or the bits of a digital word for the active line or bit with the highest priority. The input lines or bits of a digital word are ranked in order of priority from the highest to the lowest. All of the input lines or bits are scanned by a priority encoder to determine which of the input lines or bits are active. Then, the priority encoder provides an output code word which identifies the line number or bit of the highest priority active input line or bit.

One important application of priority encoder is to scan the interrupt request lines in a computer system for the highest-priority request. Another application is to arbitrate and to prioritize allocation of the various resources in a computer system, which has a number of prioritized users.

Certain priority-encoder applications require scanning either a very large number of input lines or a very large number of bits of a digital word. Various schemes are available for expanding basic priority-encoder integrated circuit designs to handle larger numbers of input lines or bits. Specific applications requiring a large number of input bits are in the fields of pattern recognition and database management. Pattern recognition is used for analysis of images, speech patterns, and acoustics. For pattern recognition applications, the width of a large data word depends on the specific type of data being analyzed. For image analysis, the data words may be hundreds of bits in length, while in speech analysis, the data words may be 48 bits, or even as short as 16 bits. For database management applications, the length of a data word is determined by the number of characters in a data string. Even within the same database management system, the data word may be either fixed in length or variable in length depending on the type of data being handled. Consequently, it is expected that a priority encoder design should be able to accommodate the requirement that the length of a data word can vary from system to system as well as from application to application within one system.

Discrete integrated-circuit priority encoders, such as the SN54/74S148 and SN54/74S348, provided by Advanced Micro Devices, Inc. of Sunnyvale, Calif., priority-encode eight input request lines into a 3-bit binary code word, which is provided at the output terminals. To provide for expansion by cascading of these integrated-circuit encoders, three control signals are provided, which include an enable input signal EI, an enable output signal EO, and a group select signal GS. These priority encoders internally use combinatorial logic gates to select the highest-priority input line. To accommodate a greater number of input lines, several of these priority encoders are cascaded using the EI, EO, and GS signals. For example, to accommodate 64 input lines, 8 of these 8-input-integrated circuit priority encoders are used to receive the 64 input lines. To provide a second level of logic, an additional integrated-circuit priority encoder is used. The combinatorial logic circuits of these types of integrated circuits consume large amounts of chip area.

The Advanced Micro Devices, Inc. AM99C10 content-addressable-memory CAM internally incorporates a 256 input-line priority encoder, which uses a combinatorial logic circuit design similar to that of the SN54/74S148 design. A considerable amount of chip area could be saved if a simpler 256 input-line priority encoder design were available to replace combinatorial logic designs for priority encoders.

SUMMARY OF THE INVENTION

It is an object of the invention to provide a priority encoder which has the ability to decode longer code words in a user system with minimal additional burdens on the user system hardware and operating software.

It is an object of the invention to provide a priority-encoder design which uses minimal area and which is especially useful in integrated circuits.

In accordance with these and other objects of the invention, a priority encoder is provided for receiving request signals from $2^N$ input request lines and for providing an N-bit output code word which identifies the highest-priority, currently-active, input request line. $2^N$ input request terminals receive request signals from respective input request lines. Each of the $2^N$ input request terminals has a successive binary identification number assigned and each of the $2^N$ input request terminals are ranked in order of priority so that lower binary identification numbers are assigned higher priority with the lowest binary identification number having the highest priority. N output terminals each respectively provide one bit of an N-bit output binary code word, which indicates the binary identification number of the highest-priority, currently active input request terminal.

A plurality of N logic circuits are provided, each of which are respectively associated with one of the N output terminals. Each of the plurality of N logic circuits has input terminals which are coupled respectively to the input request terminals of a first predetermined group of the $2^N$ input request terminals. The first group of input request terminals are identified as being those input request terminals which have a logical TRUE value in the bit position of the N-bit output binary code word associated with a particular one of said input request terminals. Each of the N logic circuits also has a logic output terminal which is coupled to each one of a second predetermined group of the $2^N$ input request terminals. The second group of request terminals are identified as being those input request terminals which have a logical FALSE value in the bit position of the N-bit output binary code word associated with a particular one of the input request terminals. The logic output terminal provides a signal for disabling the input request terminals of the second group when one or more of said first group of input request terminals are active. Cascaded delay circuits are provided for sequentially enabling each of the N logic circuits. Starting with the logic circuit associated with the highest order bit of the N-bit output binary code word, enablement of the next, lower-order, logic circuit is successively delayed until a higher-order logic circuit has completed operation.

A cascaded series of delay circuits provide means for sequentially enabling each of the N logic circuits. Each of the logic circuits includes pull-down transistors, which are connected to the input terminals of the second group of input request terminals to disable those input request terminals whenever one of the first group of input request terminals is active. Each logic circuit includes an AND gate having one input terminal coupled to the means for sequentially enabling each of the logic circuits and having a second input terminal activated by one of said first group of input request terminals. The AND gates have output terminals for disabling the second group of input request terminals.

A significant advantage of the present invention over priority-encoder design such as, for example, the Am 99C10 is that the instant invention reduces the area required for a 256-bit encoder by more than a factor of 2 and provides improved speed and performance.

BRIEF DESCRIPTION OF THE DRAWINGS

The accompanying drawings, which are incorporated in and form a part of this specification, illustrate an embodiment of the invention and, together with the description, serve to explain the principles of the invention.

DETAILED DESCRIPTION OF THE PREFERRED EMBODIMENTS

Figure 1:
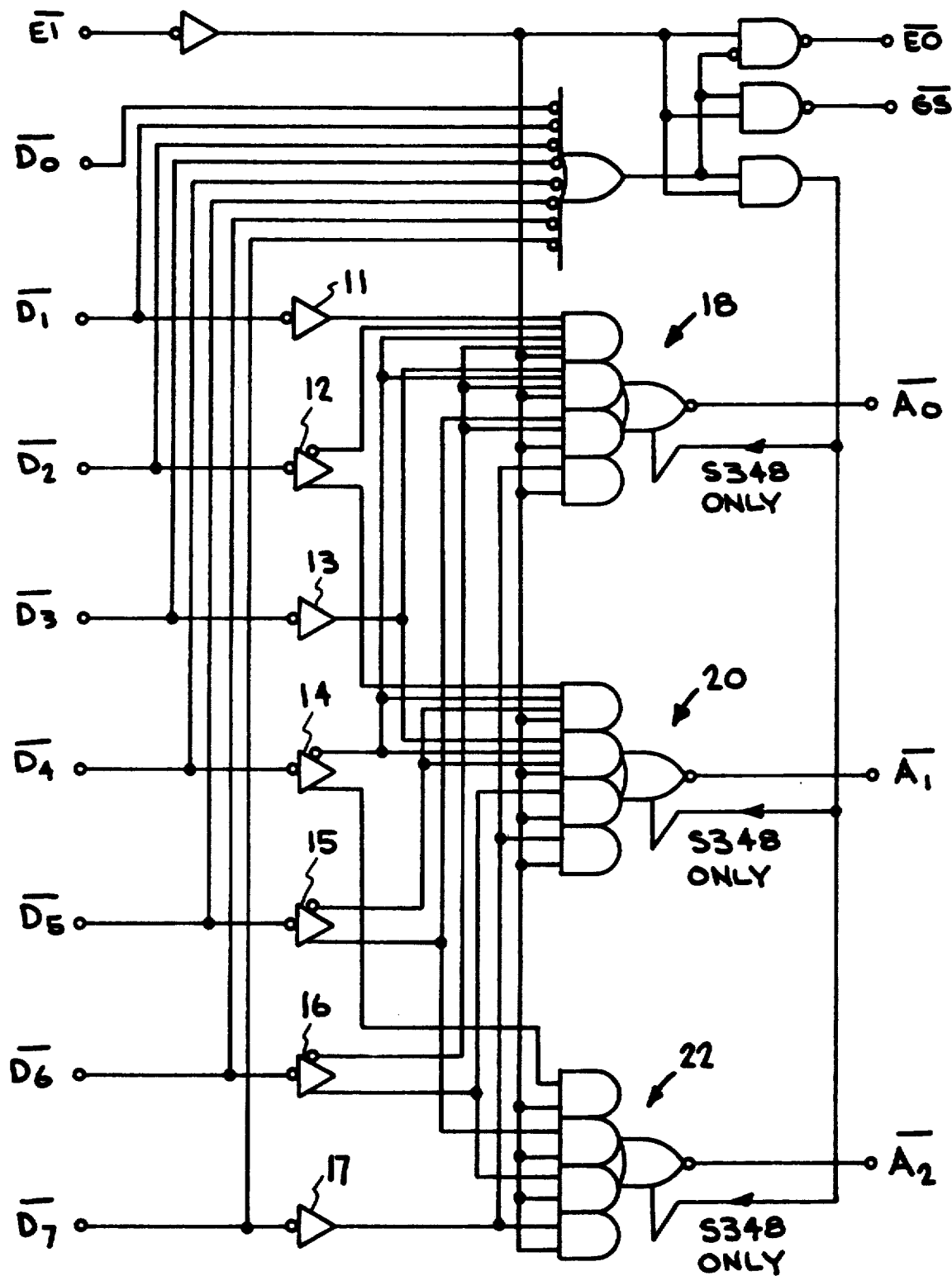
FIG. 1 is a logic circuit diagram of a prior art 8-line input/3-bit output priority encoder.

Reference will now be made in detail to a preferred embodiment of the invention, an example of which is illustrated in the accompanying drawing. While the invention will be described in conjunction with the preferred embodiment, it will be understood that it is not intended to limit the invention to that embodiment. On the contrary, the invention is intended to cover an encoding matrix, formed of a number of combinatorial-logic AND-NOR gate groups 18,20,22, as shown in the Figure. The output signals of these gate groups are controlled by an enable input signal EI. When the enable input signal EI is not asserted, the output terminals of the encoder 10 are forced into a High, or logical zero, state for the 54/74S148 and into a Hi-Z impedance state for the 54/74S348. When the enable input signal EI is asserted, the output terminals provide the code for the line-number of the highest-priority active input signal D0-D7. Signals EO and GS are complementary. EO indicates that no data-input signal D0-D7 is being asserted, while GS indicates that at least one of the data-input signals D0-D7 is being asserted. EO and EI are used to cascade encoders together in a daisy-chain configuration.

In a two-level cascaded encoder configuration, the GS signals from first-level encoders are the data inputs for second-level encoders. For example, for a 64 input-line encoder, eight tri-state SN54/74S348 encoders form a first level. The GS outputs from the SC digit first-level encoders are the input signals to the second-level encoder. The first-level-encoder hi-Z outputs are bussed together to form the least-significant octal digit of a 6-bit line-number code word for the highest-priority data-input line being asserted. The outputs of the second-level encoder form the most-significant octal digit. The FUNCTION TABLE shows the outputs provided for various input signals being asserted for the encoder of FIG. 1. The encoder logic function shown in the FUNCTION TABLE is generally applicable to various encoder designs, including an encoder according to the present invention.

| | INPUTS | | | | | | | | FUNCTION TABLE | | OUTPUTS | | |
|---|---|---|---|---|---|---|---|---|---|---|---|---|---|
| $\overline{EI}$ | $\overline{D}0$ | $\overline{D}1$ | $\overline{D}2$ | $\overline{D}3$ | $\overline{D}4$ | $\overline{D}5$ | $\overline{D}6$ | $\overline{D}7$ | $\overline{A}2$ | $\overline{A}1$ | $\overline{A}0$ | $\overline{GS}$ | $\overline{EO}$ |
| H | X | X | X | X | X | X | X | X | H/Z* | H/Z* | H/Z* | H | H |
| L | H | H | H | H | H | H | H | H | H/Z* | H/Z* | H/Z* | H | L |
| L | X | X | X | X | X | X | X | L | L | L | L | L | H |
| L | X | X | X | X | X | X | L | H | L | L | H | L | H |
| L | X | X | X | X | X | L | H | H | L | H | L | L | H |
| L | X | X | X | X | L | H | H | H | L | H | H | L | H |
| L | X | X | X | L | H | H | H | H | H | L | L | L | H |
| L | X | X | L | H | H | H | H | H | H | L | H | L | H |
| L | X | L | H | H | H | H | H | H | H | H | L | L | H |
| L | L | H | H | H | H | H | H | H | H | H | H | L | H |

*NOTE: "H" for 'S148, "Z" for 'S348 alternatives, modifications and equivalents, which may be included within the spirit and scope of the invention as defined by the appended claims.

Figure 2A:
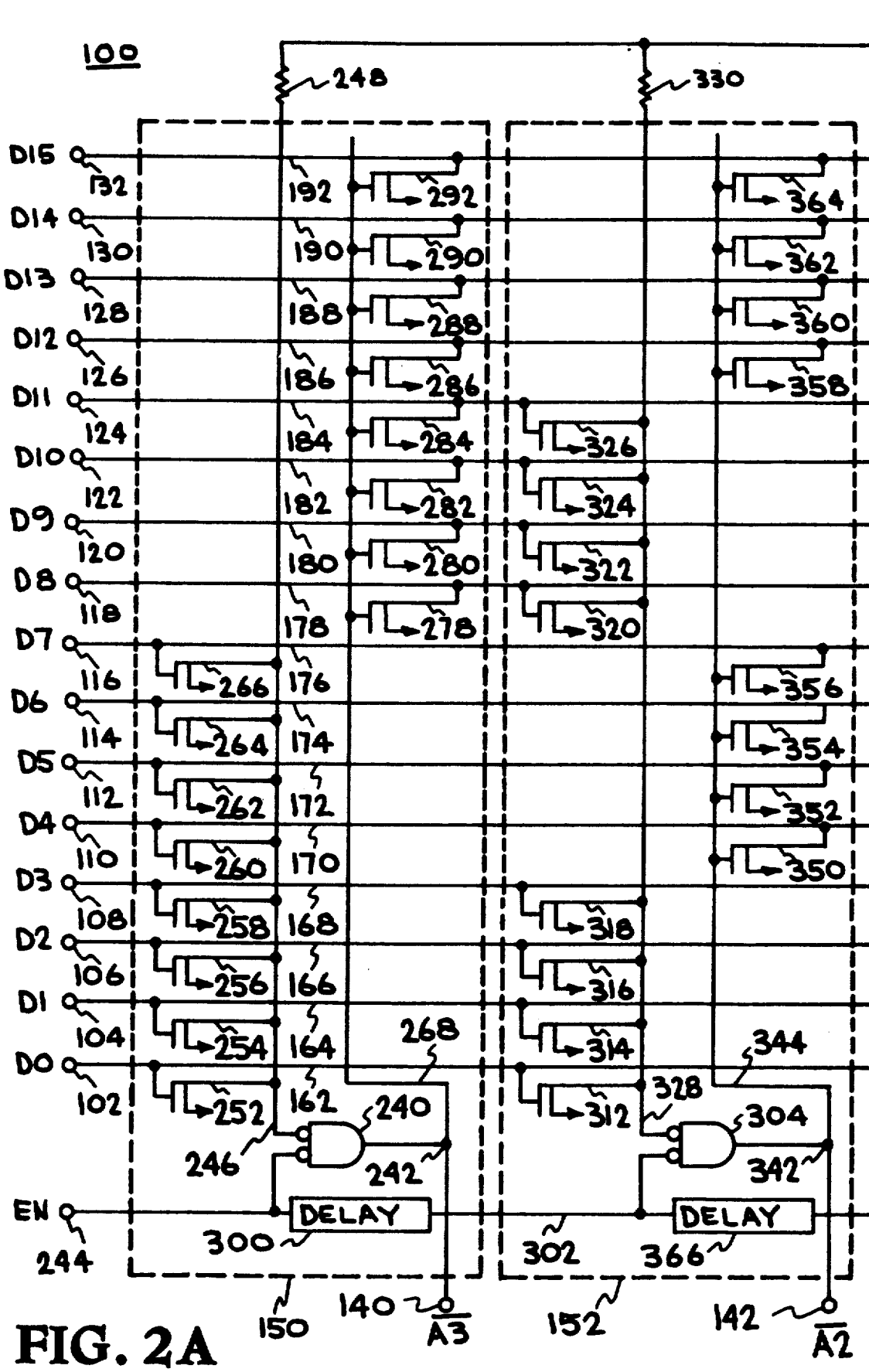
FIGS. 2A and 2B are is a circuit diagram of a 16-line input/4 bit output priority encoder.
Figure 2B:
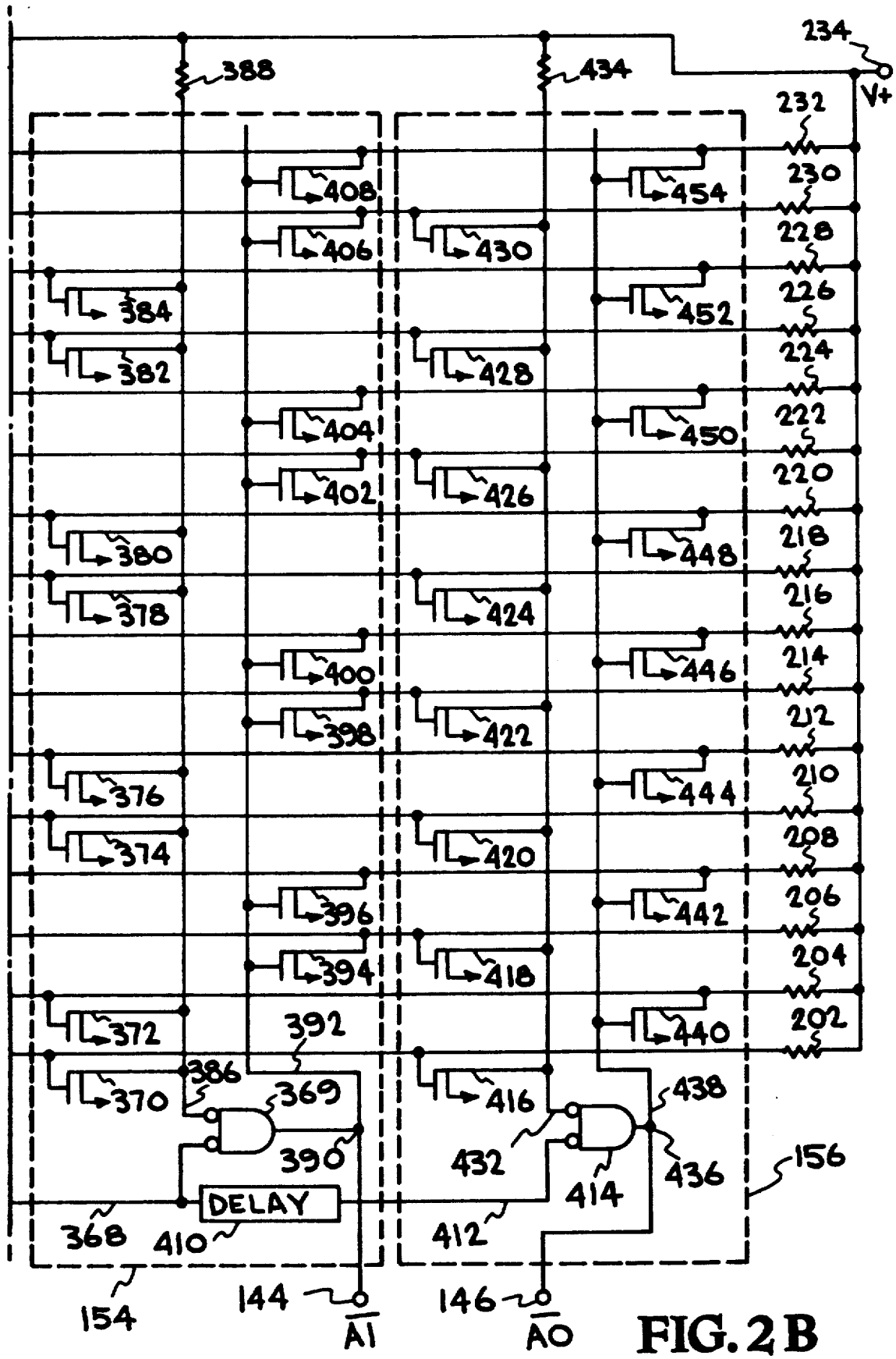

FIG. 1 shows a logic circuit diagram of a prior art priority encoder 10 provided by Advanced Micro Devices, Inc. of Sunnyvale, Calif. as part number SN54/74S148 for a conventional two-level encoder and as part number SN54/74S348 for a tri-state output encoder. This encoder design uses negative logic polarity, that is, a low voltage signal is a logical one while a high voltage signal is a logical zero. The encoder "scans" the 8 data-input, or request, terminals for any of the input signals D0-D7 being at a logical one level. A 3-bit binary code (A0, A1, A2) at three output terminals provides the line number of the highest-priority data input signal being asserted. Each of the input terminals for the signals D0-D7 are connected to the respective input terminals of data input buffers 11-17. Various inverted and non-inverted output signals from these data input buffers 11-17 are fed to the input terminals of FIGS. 2A and 2B show a circuit diagram of an example of a priority encoder 100 according to the invention. Sixteen, or $2^N$ (where N equals 4) active-high priority request input signals (D0 through D15) are received on corresponding input request terminals 102 through 132, as shown in the Figure. Priority-request signal D0, when active, has the highest priority, D1 has the next highest priority, etc. D15 has the lowest priority.

Four output terminals 140, 142, 144, 146 each respectively provide one bit of a N-bit (where N equals 4) output binary code word. The 4-bit output binary code word indicates the inverse of the binary identification number A3, A2, A0, A1 of the highest-priority, currently-active, input request terminal. Request signal D0 is identified with the binary identification number 0000. Request signal D15 is identified with the binary identification number 1111. Consequently, the highest ranked request signals have the lowest binary identification numbers. Thus, if D0 is the highest ranking, active request signal, terminals 140 through 144 have all 1 values, that is, the inverse of the D0 binary identification number. Similarly, if D15 is the only active request signal, terminals 140 through 144 have all 0 values.

Associated with each of the output terminals 140, 142, 144, 146, are respective logic circuits 150, 152, 154, 156, each of which respectively provide one bit of the 4-bit output binary code word. The basic function of the logic circuits is that, for each bit, those input request lines, which, (when active) have a 1 in that bit for their binary identification numbers, cause the other input request lines to be pulled down.

Logic circuit 150 is associated with the highest-order bit A3 of the 4-bit output binary code word, the inverse of A3 being provided at terminal 140. Logic circuit 152 is associated with the next highest-order bit A2, the inverse of which is provided at terminal 142. Logic circuit 154 is associated with the bit A1, the inverse of which is provided at terminal 144. Logic circuit 156 is associated with the lowest-order bit A0, the inverse of which is provided at terminal 146.

Note that each of the input request terminals 102 through 132 are connected through respective internal request signal lines 162 through 192 to one terminal of respective pull-up resistors 202 through 232. The other terminal of each of the respective pull-up resistors 202 through 232 are connected to a common terminal 234 having a positive voltage V+ applied thereto.

Logic circuit 150 includes a 2 inverted-input AND gate 240 which has its output terminal 242 connected to the output terminal 140 for the inverted most-significant bit A3 of the 4-bit output binary code word. The first inverting input terminal of the AND gate 240 is connected to an input terminal 244 for an enable signal EN, which is an active-low signal. Connected to the second inverting input terminal of the AND gate 240 is a signal line 246 which is coupled through a pull-up resistor 248 to the common V+ terminal 234. The respective gate terminals of the eight pull-down transistors 252 through 266 are connected to the respective input request terminals 102 through 116 for the input request signals D0 through D7, as shown. The source terminals of each of the pull-down transistors 252 through 266 are connected to a common ground potential. The drain terminals of each of the pull-down transistors 252 through 266 are connected to signal line 246 to the first inverting input of the AND gate 240. The output terminal 242 of the AND Gate 240 is connected through a signal line 268 to the gate terminals of a group of eight pull-down transistors 278 through 292, each of which has its source terminal connected to the ground reference potential. The respective drain terminals of the pull-down transistors 278 through 292 are connected to the respective input request terminals 118 through 132 for the input request signals D8 through D15, as shown in the Figure.

When any of the upper half, that is, higher-priority, of the input request terminals for D0 through D7 are at an active high state and when the enable signal EN at terminal 244 is at an active-low state, the output terminal of the inverting-input AND gate 240 goes to a high state. This causes the lower-ordered (lower priority) half of the input request terminals (118 through 132) for D8 through D15 to be pulled to low states through the respective pull-down transistors 278 through 292. Thus, any of the higher-ordered half of the input request terminals disables the lower-ordered half of the input request terminals.

Logic circuit 150 includes a delay circuit 300 having its input terminal connected to the enable input signal terminal 244. The delay time is set to be somewhat greater than the delay of the pull-down transistors 252 through 266, the AND gate 240, and pull-down transistors 278 through 292. The delay ensures that if any of the higher priority request signals D0 through D7 is active, enough time is allowed to disable request signals D8 through D15 before logic circuit 152 is enabled.

Logic circuit 152 functions in a manner similar to logic circuit 150 and provides an inverted A2 bit for the binary identification number of the highest-priority, currently-active, input request terminal. An active-low delayed enable signal from the delay circuit 300 of logic circuit 150 is coupled through a signal line 302 to a first inverting input terminal of another 2 inverted-input AND Gate 304. Those input request terminals (D0 through D3 and D8 through D11) which are encoded with a 1 bit in the A2 bit of the output binary code word are connected to the respective gate terminals of respective pull-down transistors 312 through 318 and 320 through 326, as shown in the Figure. The source terminals of these pull-down transistors are connected to a ground reference potential. The drains of each of these transistors are connected to a signal line 328 which is coupled through a pull-up resistor 330 to the V+ terminal 234. When one of the terminals which has a 1 bit in the A2-bit of its output binary code word is active, signal line 328 is pulled to a low state. When the delayed enable signal on signal line 302 goes to a low state, the output terminal 342 of the AND gate 304 and the signal line 344 connected thereto goes to a low state. The gate terminals for two groups of four pull-down transistors 350, 352, 354, 356 and 358, 360, 362, 364 are connected to signal line 344, while the source terminals of each one of these pull-down transistors are connected to a ground reference potential. The collectors of these transistors are respectively connected to those input request terminals (D4 through D7 and D12 through D15) which are encoded with a 0 bit in the A2-bit of the output binary code word. These request terminals are disabled when any of the D0 through D3 or D8 through D11 input request terminals are active.

A delay circuit 366, which is similar to the delay circuit 300 of the logic circuit 150 provides a similar delay time to ensure that the input request signals D0 through D3 and D8 through D11 have enough time to disable input request signals D4 through D7 and D12 through D15 before circuit 154 is enabled.

Logic circuit 154 functions in a manner similar to logic circuits 150 and 152. Logic circuit 154 provides an inverted A1-bit signal at terminal 144 for the binary identification number of the highest-priority, currently-active, input request terminal. An active-low delay enable signal from the delay circuit 366 is coupled through a signal line 368 to a first inverting input terminal of another 2 inverted-input AND gate 369. Those input request terminals (D0, D1, D4, D5, D8, D9, D12, D13) which are encoded with a 1 bit in the A1-bit of the output binary code word are connected to the respective gate terminals of respective pull-down transistors 370 through 384, as shown in the Figure. The source terminals of these pull-down transistors are connected to a ground reference potential. The drain terminals of each of these transistors are connected to a signal line 386 which is coupled through a pull-up resistor 388 to the V+ terminal 234. When one of the terminals which has a 1 bit in the A1-bit of its output binary code word is active, signal line 386 is pulled to a low state. When the delayed enable signal from the delay circuit 366 also goes to a low state, the output terminal 390 of the AND gate 369 and the signal line 392 connected thereto go to a low state. The gate terminals for four groups of two pull-down transistors 394 through 408 are connected to the signal line 392, while their source terminals are connected to a ground reference potential. The collectors of these transistors are respectively connected to those input request terminals D2, D3, D6, D7, D10, D11, D14, D15) which are encoded with a 0 bit in the A1-bit of the output binary code word. These input request terminals are disabled when any of the D0, D1, D4, D5, D8, D9, D12, D13 are active.

Another delay circuit 410, similarly to the delay circuits 300 and 366, provide a delay time to the enable signal to ensure that those input request signals with a 1 in the A1-bit have enough time to disable the input request signals having a 0 in the A1-bit before circuit 156 is enabled.

Logic circuit 156 functions in a manner similar to logic circuits 150, 152, 154. Logic circuit 156 provides an inverted A0-bit signal at terminal 146 for the binary identification number of the highest-priority, currently-active, input request terminal. An active-low delay enable signal from the delay circuit 410 is coupled through a signal line 412 to a first inverting input terminal of another 2-inverted input AND gate 414. Those input request terminals (D0, D2, D4, D6, D8, D10, D12, D14) which are encoded with a 1 in the A0-bit position of the output binary code word are connected to the respective gate terminals of respective pull-down transistors 416 through 420, as shown in the Figure. The source terminals of the pull-down transistors are connected to a ground reference potential. The drain terminals of each of these transistors are connected to a signal line 432 which is coupled through a pull-up resistor 434 to the V+ terminals 234. When one of the terminals which has a 1 bit in the A0-bit of the input binary code word is active, signal line 432 is pulled to a low state. When the delayed enable signal from the delay circuit 410 also goes to a low state, the output terminal 436 of the AND gate 414 and the signal line 438 connected thereto go to a low state. The gate terminals for eight pull-down transistors 440 through 454 are connected to signal line 438, where their source terminals are connected to a ground reference potential. The collectors of these transistors are respectively connected to those input request terminals (D1, D3, D5, D7, D9, D11, D13, D15) which are encoded with a bit in the A0-bit position of the output binary code word. These input request terminals are disabled when any of the input request terminals (D0, D2, D4, D6, D8, D10, D12, D14) are active.

The foregoing descriptions of a specific embodiment of the present invention have been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A priority encoder for receiving request signals from $2^N$ input request lines and for providing an N-bit output code word which identifies the highest-priority, currently-active, input request line, comprising:

$2^N$ input request terminals for receiving request signals from respective input request lines, each of said $2^N$ input request terminals having a successive binary identification number assigned thereto, wherein each of the $2^N$ input request terminals are ranked in order of priority so that lower binary identification numbers are assigned higher priority with the lowest binary identification number having the highest priority;

N output terminals, each respectively providing one bit of an N-bit output binary code word, which indicates the binary identification number of the highest-priority, currently active input request terminal;

a plurality of N logic circuits, each of which are respectively associated with one of said N output terminals;

wherein each of said plurality of N logic circuits has input terminals which are coupled respectively to input request terminals of a first predetermined group of said input request terminals, which are identified as having a logical TRUE value in the bit position of the N-bit output binary code word associated with a particular one of said input request terminals;

wherein each of said plurality of N logic circuits also has a logic output terminal which controls each one of a second predetermined group of said $2^N$ input request terminals, which are identified as being those input request terminals which have a logical FALSE value in the bit position of the N-bit output binary code word associated with a particular one of said input request terminals;

wherein said logic output terminal provides a signal for disabling the each of the input request terminals of said second group of input request terminals when one or more of said first group of input request terminals are active;

means for sequentially enabling each of said N logic circuits by, starting with the logic circuit associated with the highest order bit of the N-bit output binary code word, successively delaying enablement of the next logic circuit associated with a lower order bit until the higher-order logic circuit has completed operation.

2. The priority encoder of claim 1 wherein said means for sequentially enabling each of said N logic circuits includes a cascaded series of delay circuits for sequentially providing successively delayed enable signals to each of the plurality of logic circuits, with the logic circuits receiving enable signal according to the order of the N output terminals.

3. The priority encoder of claim 1 wherein each of said logic circuits includes pull-down transistors coupled to the input request terminals of said second group of input request terminals for disabling said second group of input request terminals when one of said first group of input request terminal is active.

4. The priority encoder of claim 1 wherein each of said logic circuits includes an AND gate, having an input terminal coupled to said means for sequentially enabling each of said N logic circuits and having an input terminal activated by one of said first group of input request terminals, said AND gate providing an output signal for disabling the second group of input request terminals.

5. A priority encoder for receiving request signals from $2^N$ input request lines and for providing an N-bit output code word which identifies the currently active, highest-priority input request line, comprising: from 2N input request terminals for receiving request signals from respective input request lines, each request terminal being identified by an N-bit binary identification code word, each request terminal being coupled to a first reference voltage level through a respective pull-up resistor;

N output terminals, each respectively providing one bit of an N-bit output binary identification code word identifying the currently-active request terminal with the highest priority;

each one of said N output terminals having a logic circuit associated therewith;

each of said logic circuits including means for sensing a request signal on any one of a first set of N/2 input terminals, where each of said first set of input terminals have a HIGH value in its binary identification code word for the bit corresponding to the output terminal with which a particular logic circuit is associated;

each of said logic circuits also including N/2 pull-down transistors which are respectively connected to the input terminals of a second set of N/2 inputs terminals, where each of said second set of input terminals have a LOW value in its binary identification code word for the bit corresponding to the output terminal with which a particular logic circuit is associated;

each of said logic circuits having means for operating the pull-down transistors to disable the second set of input terminals when any one of set first set of input request terminals is active;

means for sequentially enabling each of said logic circuits, starting with the logic circuit which is associated with the highest-order bit of the N-bit output binary identification code word.

6. The priority encoder of claim 5 wherein each logic circuit includes a plurality of pull-down transistors, each respectively having an input terminal connected to one of said first set of input terminals and each respectively having and output terminal connected to a terminal of a common pull-up resistor so that an active LOW state on any of the terminals of the first set of input terminals pulls the terminal of the pull-up resistor to a LOW state;

a logic gate having a first input terminal connected to the terminal of the pull-up resistor, said logic gate having a second input terminal connected to the means for sequentially enabling each logic circuit, said logic gate having an output terminal coupled to the pull-down transistors connected to the second set of input request terminals for disabling said second set of transistors when one of said first set of input request terminals is active.

* * * * *